(12) United States Patent
Drake et al.

(10) Patent No.: US 9,439,349 B2
(45) Date of Patent: Sep. 13, 2016

(54) AUTO CONFIGURATION OF ELECTRICALLY POWERED REEL CUTTING UNITS ON A REEL MOWER

(71) Applicant: The Toro Company, Bloomington, MN (US)

(72) Inventors: Jeffrey T. Drake, Richfield, MN (US); Kelly S. Meemken, Savage, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 14/789,487

(22) Filed: Jul. 1, 2015

(65) Prior Publication Data

US 2016/0000006 A1    Jan. 7, 2016

Related U.S. Application Data

(60) Provisional application No. 62/021,361, filed on Jul. 7, 2014.

(51) Int. Cl.
| | | |
|---|---|---|
| *A01D 34/00* | (2006.01) | |
| *A01D 34/44* | (2006.01) | |
| *A01D 34/58* | (2006.01) | |

(52) U.S. Cl.
CPC .......... *A01D 34/008* (2013.01); *A01D 34/006* (2013.01); *A01D 34/44* (2013.01); *A01D 34/58* (2013.01)

(58) Field of Classification Search
CPC ..... A01D 34/008; A01D 34/58; A01D 34/44
See application file for complete search history.

(56) References Cited

U.S. PATENT DOCUMENTS

| | | |
|---|---|---|
| 6,119,442 A | 9/2000 | Hale |
| 6,513,311 B1 | 2/2003 | Berger et al. |
| 7,487,024 B2 | 2/2009 | Farley et al. |
| 7,610,738 B2 | 11/2009 | Daly et al. |
| 2008/0268927 A1* | 10/2008 | Farley ................ A01D 41/1243 460/111 |

* cited by examiner

*Primary Examiner* — Yuen Wong
(74) *Attorney, Agent, or Firm* — James W. Miller

(57) ABSTRACT

A gang reel mower comprises a frame that carries a plurality of variable speed, electrically powered reel cutting units. Cutting units having different reel diameters may be installed on the frame. Upon system power up, a mower controller on the frame automatically acquires information identifying the reel size of the cutting units then installed on the frame and uses the acquired reel size information to properly set the speed of the electric motors driving the cutting units to a desired value, such as that needed to maintain a desired clip. Thus, the cutting units can be changed in size with the mower controller automatically recognizing the change in a plug and play manner.

11 Claims, 2 Drawing Sheets

AUTO CONFIGURATION OF ELECTRICALLY POWERED REEL CUTTING UNITS ON A REEL MOWER

TECHNICAL FIELD

This invention relates to a turf mower that carries one or more electrically driven reel cutting units for cutting grass.

BACKGROUND OF THE INVENTION

Turf mowers having one or more reel cutting units carried on a frame for cutting grass over a wide cutting swath are well known. In a gang mower configuration, a plurality of reel cutting units are usually arranged in front and rear rows with the cutting units in each row being laterally spaced from one another if there is more than one cutting unit in each row. The cutting units in the respective rows are laterally staggered relative to the cutting units in the other rows so that the gaps between the cutting units in one row are covered by the cutting unit(s) in another row. This allows the gang configuration of cutting units to cut an unbroken swath of grass during a single pass of the gang mower. Typically, gang mowers of this type comprise riding mowers that are operated by an operator carried on a seat provided on the mower.

Turf mowers of this type traditionally have been powered by an internal combustion engine carried on the frame of the mower, typically either a diesel engine or a gasoline powered engine. In many cases, the engine powers one or more hydraulic pumps that supply pressurized hydraulic fluid to a plurality of hydraulic motors that power the reel cutting units. The reel cutting units are available in different diameters, e.g. cutting units having a 5 inch diameter reel or cutting units having a 7 inch diameter reel. The reason for this is that different diameter reels are more effective in cutting different types of grass or at different times of the year. However, because of substantially different hydraulic requirements depending upon whether 5 inch or 7 inch reel cutting units are used, the traction unit that carry such cutting units had to be individually designed and manufactured for each sized reel cutting units. The same traction unit having the same hydraulic system could not be used to power both 5 inch reel cutting units and 7 inch cutting units, without significant changes to the hydraulic system.

The result of this fact meant that a manufacturer had to manufacture one traction unit to carry 5 inch hydraulic reel cutting units and a second separate traction unit to carry 7 inch hydraulic reel cutting units. A customer who wished to have both sizes of reel cutting units available for use had to purchase two different traction units each equipped with the size of reel cutting unit for which they were designed. Needless to say, this was expensive for the customer. It was also expensive for the manufacturer since a common traction unit platform could not be manufactured to carry both sizes of reel cutting units.

SUMMARY OF THE INVENTION

One aspect of this invention relates to a reel mower which comprises a frame supported for rolling over a turf surface having grass. Plural reel cutting units are carried on the frame. Each reel cutting unit comprises a cutting reel rotatable about a horizontal axis for pushing blades of grass against a cooperating bedknife to sever blades of grass on the turf surface in a shearing action between the cutting reel and the bedknife. The cutting reels of the cutting units are individually powered by separate variable speed electric motors such that a first electric motor drives the cutting reel of a first cutting unit, a second electric motor drives the cutting reel of a second cutting unit, a third electric motor drives the cutting reel of a third cutting unit, and so on. The cutting units that are carried on the frame are selected from a group of cutting units consisting of 1) cutting units having cutting reels of a first diameter and 2) cutting units having cutting reels of a second diameter that is different than the first diameter. Each electric motor that drives a cutting reel of a particular cutting unit includes an electronic motor controller. An electronic, microprocessor based, mower controller is carried on the frame and is operatively connected with the motor controllers of the electric motors of all the cutting units that are currently being carried on the frame. In addition, the mower controller is configured to 1) automatically acquire, prior to a mowing operation, reel size information that identifies whether the currently carried cutting reels being driven have the first or the second diameter, and to 2) automatically use the acquired reel size information to properly set the speeds of the cutting reels of all the currently carried cutting units during the mowing operation.

Another aspect of this invention relates to a reel mower which comprises a frame that carries a plurality of variable speed, electrically powered reel cutting units. The cutting units carried on the frame may have either first or second reel diameters that are different from one another. A mower controller on the frame automatically acquires reel size information identifying the reel diameters of all the cutting units then carried on the frame and uses the acquired reel size information to properly set the speed of the electric motors driving the cutting units to a desired value to thereby permit the cutting units to be changed in size with the mower controller automatically recognizing the change in a plug and play manner.

BRIEF DESCRIPTION OF THE DRAWINGS

This invention will be described more specifically in the following Detailed Description, when taken in conjunction with the following drawings, in which like reference numerals refer to like elements throughout.

DETAILED DESCRIPTION

Figure 1:
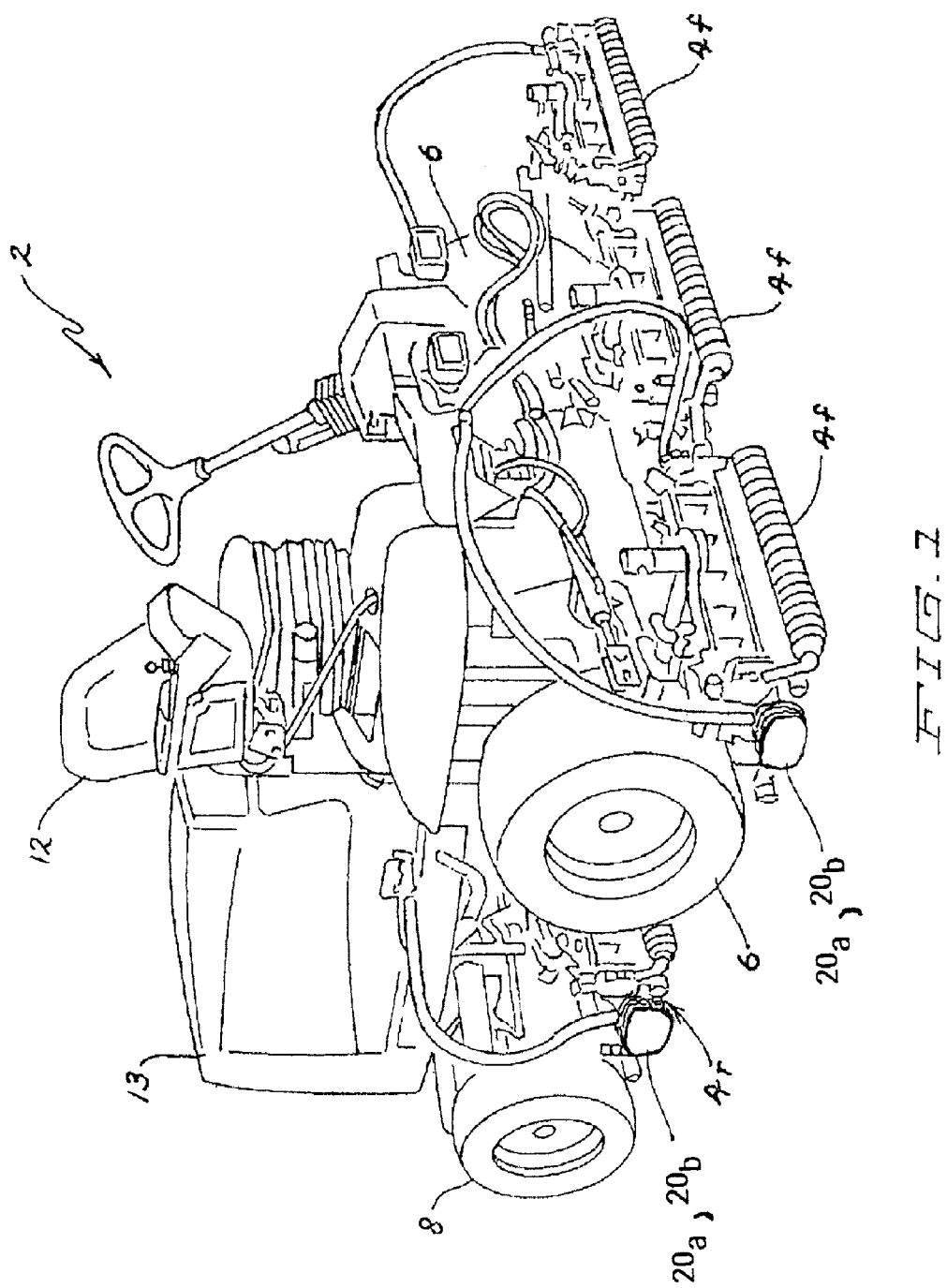
FIG. 1 is a perspective view of one embodiment of a gang mower according to this invention.

FIG. 1 illustrates a conventional gang mower as 2. Mower 2 incorporates a plurality of cutting units 4 arranged in a 3-2 gang configuration. Such a configuration includes three laterally spaced front cutting units $4_f$ placed in a front row thereof ahead of the front wheels 6 of mower 2. A pair of laterally spaced rear cutting units $4_r$ (one of which can be seen in FIG. 1) is placed in a rear row between front wheels 6 and rear wheels 8 of mower 2. Rear cutting units $4_r$ are staggered to cover the gaps between front cutting units $4_f$ to cut an unbroken swath of grass. Other gang configurations (e.g. a 2-3, 4-3, 3-4, 2-1 or 1-2) could be used.

Cutting units 4 shown in FIG. 1 comprise reel cutting units each of which includes a rotatable cutting reel having a plurality of circumferentially spaced, helically twisted blades that may vary in number, e.g. five, eight, eleven, etc. blades. As the reel of the reel cutting unit rotates, the blades of the reels push standing blades of grass against a fixed bedknife to shear the grass between the reel and the bedknife. FIG. 1 depicts a gang reel mower according to one embodiment of this invention. Cutting units 4 used in this embodiment of mower 2 will be powered by their own separate electric motors $20_a$ or $20_b$. Since there are five cutting units 4 shown in the embodiment of FIG. 1, there will be five electric motors $20_a$ or $20_b$ for powering such cutting units 4, one motor $20_a$ or $20_b$ for each cutting unit 4.

Mower 2 includes a seat 12 for carrying an operator who rides atop mower 2. Mower 2 has a rear cowl 13 that encloses an internal combustion engine such as a diesel engine. An electrical generator/alternator (not shown) is operatively connected to the drive shaft of the engine for generating electrical power as the engine runs. In addition, an electrical storage device (not shown), such as a battery pack or an ultracapacitor, is provided on mower 2 for storing electrical power that has been generated by the generator/alternator. Together, the generator/alternator and the electrical storage device form a hybrid electric power supply system for powering electric motors $20_a$ or $20_b$ that are attached to the reel cutting units 4. However, the electrical storage device could be deleted if so desired such that the generator/alternator is the sole source of electric power or the generator/alternator could be deleted such that an externally rechargeable battery pack could be the sole source of electric power. The electrical power supply system of mower 2, whatever the system comprises, also provides electric power for powering components other than electric motors $20_a$ or $20_b$ on cutting units 4, such as the main electrical supply system of mower 2 used to power the electronic controllers contained on modern mowers and other electrically powered components.

Figure 2:
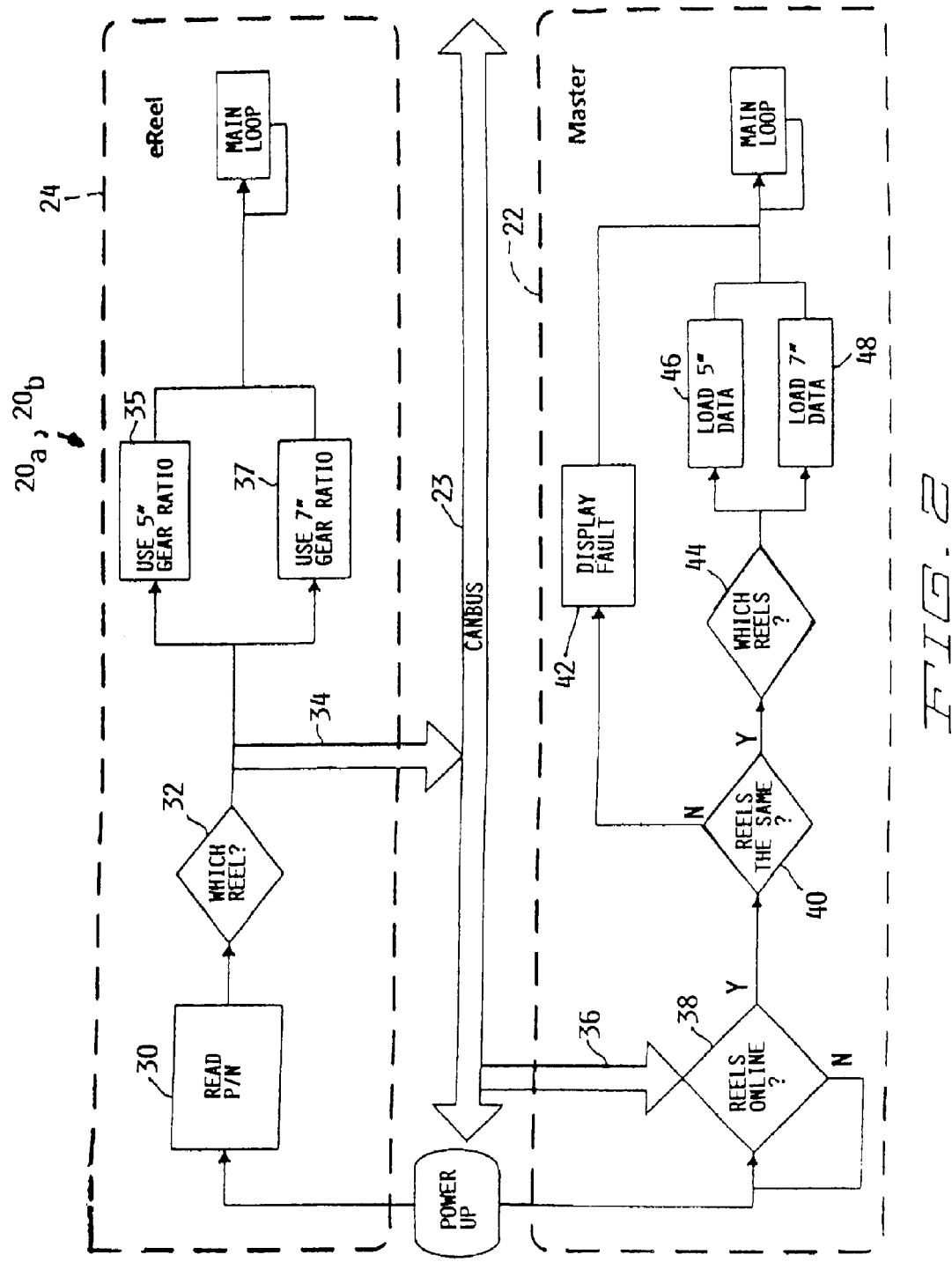
FIG. 2 is a flow chart of the automatic configuration process that takes place when electrically driven reel cutting units are installed on the gang mower of FIG. 1.

Referring now to the flow chart of FIG. 2, mower 2 has a main, microprocessor based, electronic controller 22 that is used to control the operation of mower 2. Main controller 22 receives control inputs from various sources. This includes control inputs received from an information center (not shown) on mower 2. The information center is used by the operator to input various user settable parameters into main controller 22 by the user manually entering information into various menus that may be pulled up on a display screen. The information center also uses the display screen to display information back to the operator, such as fault indications generated and displayed on the display screen by main controller 22. The information center may comprise a display screen and an adjacent keypad for data entry or a touch screen that serves both as a display screen and a data entry device.

The reel cutting units 4 of this invention are preferably provided with cutting reels having different diameters, e.g. reels with a five inch diameter or reels with a seven inch diameter. In this invention, each of the five inch cutting units 4 is powered by a first electric motor $20_a$ that is designed to mount only on a five inch cutting unit 4. Each of the seven inch cutting units 4 is powered by a second electric motor $20_b$ that is designed to mount only on a seven inch cutting unit 4. Thus, the first electric motor $20_a$ will not mechanically connect to the reel shaft of the seven inch cutting unit 4 and the second electric motor $20_b$ will not mechanically connect to the reel shaft of the five inch cutting unit 4. Consequently, the two different electric motors $20_a$ and $20_b$ cannot be mixed up and mounted on the wrong sized cutting unit 4. However, both electric motors $20_a$ and $20_b$ are provided with a common wiring harness and common electrical connectors that permit either electric motor $20_a$ or $20_b$ to connect into the electrical power supply system and CANBUS 23 of mower 2.

The first electric motors $20_a$ that drive the five inch cutting units 4 are physically smaller than the second electric motors $20_b$ that drive the seven inch cutting units 4. The first electric motors $20_a$ used on the five inch cutting units have a relatively small gear reduction between their rotors and output shafts and are designed to rotate their output shafts in a first speed range of from 700 rpm to 1940 rpm. The second electric motors $20_b$ used on the seven inch cutting units have a larger gear reduction between their rotors and output shaft and are designed to rotate their output shafts in a second lower speed range of from 500 to 1600 rpm. Thus, the seven inch cutting units have higher torque than the five inch cutting units and are accordingly better suited than the five inch cutting units to cutting certain types and lengths of grass.

One of the parameters an operator can set is the clip provided by reel cutting unit 4. Clip is the distance traveled by mower 2 between successive contacts of the blades of the cutting reel with the same shear point on the bedknife. Clip is related to the ground speed of mower 2, the rotational speed of the reel of cutting units 4, and the number of blades on the reel. The operator can use the information center to input into main controller 22 a desired clip (e.g. a ½ inch clip), the mowing speed the operator intends to mow at (e.g. 6 mph), and the number of blades on the reel (e.g. 8 blades). Using this information, main controller 22 then determines the rotational speed that the reel must rotate at to provide the desired clip (e.g. 1584 rpm), either by a process of calculation or by pulling the necessary rotational reel speed from a look up table stored in the memory of main controller 22.

As noted earlier, motors $20_a$ and $20_b$ have rotational speed ranges that begin and end at different rpms and that are different in size. Main controller 22 has look up tables for each motor 20a and 20b that splits the speed ranges for each motor into a discrete number of speed settings. For example, taking the 700 rpm to 1940 rpm speed range of motor $20_a$ used on the five inch cutting units 4 and splitting that range into 9 increments, speed setting 1 will equal 700 rpm and speed setting 9 will equal 1940 rpm. Speed settings 2-8 will be spaced between 700 rpm and 1940 rpm.

However, this look up table would not be valid for motor $20_b$ for the seven inch cutting units 4 since splitting its 500 to 1600 rpm speed range into the same 9 increments would yield a different look up table. When using such look up tables to set the rotational speed of the reel to achieve a particular clip, main controller 22 would use the speed setting from the look up table that is closest to the rotational reel speed that it has read out of the clip table as being required to achieve the desired clip. But, this would most likely mean that speed setting 6 would be the value read out of the look up table for motor $20_a$ of the five inch cutting units while speed setting 8 would be the value that would be read out of the look up table for motor 20b of the seven inch cutting units. Thus, to properly set the reel speeds for achieving the desired clip, main controller 22 must know whether the five inch reel cutting units 4 or the seven inch reel cutting units 4 are installed on mower 2, i.e. whether it should transmit speed setting 6 or speed setting 8. This invention is intended to automatically supply the reel size information to main controller 2 upon system power up so that main controller 2 automatically configures itself to use the proper look up table for setting the reel speed.

Each reel motor $20_a$ and $20_b$ includes its own motor controller 24 as a part thereof. Such motor controller 24 has a non-volatile memory that stores a part number that identifies the corresponding motor as motor $20_a$ of a five inch reel cutting unit 4 or as motor $20_b$ of a seven inch reel cutting unit 4. See block 30 of FIG. 2 which is interrogated upon system power up to read the part number. Once the part number is read, motor controller 24 is able to determine which sized reel cutting unit is attached at block 32 and reports that information to main controller 22 along line 34, CANBUS 23, and line 36. Motor controller 24 also uses that same information at blocks 35, 37 to know what gear reduction is present between the motor rotor and the motor output shaft as that gear reduction determines how fast the rotor must spin to achieve a commanded rotational speed of the motor output shaft. While the main controller 22 will determine what speed setting the motor controller 24 should use and transmit such speed setting to motor controller 24, once a particular speed setting is received motor controller 24 will automatically regulate the motor $20_a$ or $20_b$ to maintain the speed corresponding to the speed setting it has received from main controller 22.

When main controller 22 first receives the part number information identifying whether a five inch cutting unit 4 or a seven inch cutting unit 4 is attached, main controller first waits until all of the expected plurality of cutting units 4 have reported in. For example, if mower 2 is expected to have five reel cutting units 4 installed, all five reel cutting units 4 must be online to main controller 22, as shown at block 38. When all the expected reel cutting units 4 have come online to main controller, the process branches to block 40 which determines whether the part numbers identifying the reel cutting units 4 are all the same to signify that all of the attached reel cutting units 4 are the same size, i.e. all cutting units 4 are either five inch cutting units or seven inch cutting units. If a mismatch is detected at block 40 meaning one or more of the cutting units have a different size than the other cutting units, main controller 22 at block 42 displays a fault to the operator on the information center and prohibits or prevents operation of any of reel cutting units 4 until the mismatch issue is resolved.

If block 40 determines that all of the reel cutting units 4 are the same size, main controller 22 at block 44 correlates the part number for such motors $20_a$ or $20_b$ to the size of the motor to determine whether the five inch reel cutting units 4 are installed on mower 2 or the seven inch reel cutting units 4 are installed. Depending upon the answer, main controller 22 loads the configuration data, primarily the speed setting look up tables, required for the size of reel cutting units that are present, i.e. either the configuration data for the five inch cutting reels 4 as shown at block 46 or the seven inch cutting reels 4 as shown at block 48. This configuration data is then used thereafter during operation of mower 2 to set an appropriate rotational speed of the installed size of reel cutting units 4. This subroutine ends after blocks 46 or 48 and main controller 22 proceeds on to its main control loop for controlling other functions of mower 2.

This invention permits an operator of mower 2 to purchase a single traction unit designed to electrically power the plurality of reel cutting units 4 that are to be attached to such traction unit, a set of five inch reel cutting units all powered by motors $20_a$, and a set of seven inch reel cutting units all powered by motors $20_b$. If an operator wishes to use the five inch size at a particular time, the cutting units 4 having motors $20_a$ are installed on the traction unit. The control process shown in FIG. 2 automatically detects which size cutting units have been installed and automatically loads and uses the configuration data for such size, all without the operator having to do anything. If the operator later wishes to switch over and use the larger seven inch reel cutting units 4 on the traction unit, he or she can do so by removing the five inch cutting units 4 and motors $20_a$ and installing the seven inch cutting units 4 and motors $20_b$. Again, the control process shown in FIG. 2 automatically detects this change and thereafter loads and uses the configuration data for the newly installed cutting units 4 and motors 20, again without the operator having to do anything other than change out the cutting units 4 and motors 20.

Accordingly, the operator need not purchase two entirely separate traction units for five inch or seven inch cutting, but just one traction unit and two sets of cutting units 4 and motors 20. The manufacturer of mower 2 need not manufacture two separate traction units, but can manufacture a single common traction unit platform. The economic advantages to all concerned are apparent.

The scope of this invention is not to be limited to the details of the embodiment of the invention disclosed herein. For example, main controller 22 will remember the clip and the resulting reel speed settings that were last input into main controller 22 for the size of reel cutting units 4 that had been installed on mower 2 and use such settings upon system power-up. If main controller 22 receives information indicating that the size of reel cutting units 4 has been switched from one size to another size (e.g. from the five inch size to the seven inch size), main controller 22 will use the information center to display to the operator the previously stored clip and reel speed settings for the previously installed cutting units 4 (e.g. the previously installed five inch cutting units 4) as well as the reel speed settings required for the newly installed cutting units 4 (e.g. the newly installed seven inch cutting units 4). Then, main controller 22 will require the operator to verify or confirm that he or she wishes to use the reel speed settings for the newly installed cutting units 4 as an alternative to simply automatically using such reel speed settings without requiring operator verification. If the verification step described herein is optionally implemented in main controller 22, such step is preferably used only upon detection of a change in the size of the reel cutting units 22. Once the operator has verified which reel speed settings are to be used, the verification step will disappear and not reappear until the next change in reel size is reported to main controller.

Various modifications of this invention will be apparent to those skilled in the art. For example, while it is preferred that the reel size information be stored in the memory of motor controllers 24 and transmitted to the main controller 22 using two-way communication, this need not necessarily be the case. For example, main controller 22 could use digital or analog inputs to distinguish between the two different reel motors $20_a$ and $20_b$ that respectively drive the five inch or seven inch cutting reels, respectively. A simple alternative would be to provide main controller 22 with five designated inputs for the five reel motors 20 of the five cutting units carried on mower 2. If the motor connected to a particular input is a reel motor $20_a$ of a five inch cutting reel, the wiring harness for such reel motor $20_a$ could be designed to simply ground that input. Conversely, if the motor connected to a particular input is a reel motor $20_b$ of a seven inch cutting reel, the wiring harness for such reel motor $20_b$ would be somewhat differently designed to leave that input powered. Accordingly, in acquiring the reel size information in this alternative situation, main controller simply monitors the status of the five inputs for each of the motors 20 connected thereto to determine if such inputs are grounded (i.e. those cutting units would have a five inch cutting reel) or powered (i.e. those cutting units would have a seven inch cutting reel).

Thus, the scope of this invention shall be limited only by the appended claims.

The invention claimed is:

1. A reel mower, which comprises:
    (a) a frame supported for rolling over a turf surface having grass;
    (b) a plurality of reel cutting units carried on the frame, wherein each reel cutting unit comprises a cutting reel rotatable about a horizontal axis for pushing blades of grass against a cooperating bedknife to sever blades of grass on the turf surface in a shearing action between the cutting reel and the bedknife, wherein the cutting reels of the plurality of reel cutting units are individually powered by separate variable speed electric motors with each reel cutting unit being powered by one electric motor that is separate and distinct from other electric motors that power individually and separately other reel cutting units of the plurality of reel cutting units, wherein the plurality of reel cutting units that are carried on the frame are selected from a group of reel cutting units consisting of:
        (i) reel cutting units having cutting reels of a first diameter; and
        (ii) reel cutting units having cutting reels of a second diameter that is different than the first diameter,
    wherein each separate and distinct electric motor that drives a cutting reel of a reel cutting unit includes an electronic motor controller; and
    (c) an electronic, microprocessor based, mower controller carried on the frame, the mower controller being operatively connected with electronic motor controllers of the electric motors of all the reel cutting units that are currently being carried on the frame, the mower controller being configured to:
        (i) automatically acquire, prior to a mowing operation, reel size information that identifies whether the currently carried cutting reels being driven have the first or the second diameter; and
        (ii) automatically use the acquired reel size information to properly set speeds of the cutting reels of all the currently carried reel cutting units during the mowing operation.

2. The reel mower of claim 1, wherein the mower controller is further configured to properly set the speeds of the cutting reels of all the currently carried reel cutting units to maintain a substantially constant clip for each reel cutting unit, the clip for each reel cutting unit comprising a parameter expressed as a distance traveled by the frame between successive contacts of a plurality of circumferentially spaced blades on the cutting reel with a reference shear point on the cooperating bedknife.

3. The reel mower of claim 2, wherein the clip is manually input into the mower controller by an operator with the clip then being stored in the mower controller for use during the mowing operation, the operator being able to choose a desired distance for the clip at the time of input.

4. The reel mower of claim 1, wherein the mower controller automatically acquires the reel size information during a power up routine prior to the mowing operation.

5. The reel mower of claim 1, wherein the mower controller has a memory that stores a first speed look up table for use when the first diameter cutting reels are currently installed on the frame and a second speed look up table for use when the second diameter cutting reels are currently installed on the frame, and wherein the mower controller automatically uses either the first look up table or the second look up table to set the speeds of the cutting reels depending on whether the reel size information acquired by the mower controller has identified whether the first diameter cutting reels or the second diameter cutting reels are present.

6. The reel mower of claim 1, wherein the mower controller continues to use for subsequent mowing operations whatever reel speed settings were last used in an immediately preceding mowing operation until such time as the mower controller detects a change in the reel size of the reel cutting units carried on the frame, wherein the mower controller then displays to an operator the last used reel speed settings and requires the operator to confirm a change in the last used reel speed settings to new reel speed settings required for use due to a reel size change.

7. The reel mower of claim 1, wherein the mower controller prevents operation of the plurality of reel cutting units when the acquired reel size information indicates a size mismatch in the reel diameter sizes of the cutting reels that are currently carried on the frame.

8. The reel mower of claim 7, wherein the mower controller transmits an alert of the size mismatch to a display of the mower controller to allow the operator to be aware of the size mismatch in order to take corrective action.

9. The reel mower of claim 1, wherein the electric motors comprise a first model of electric motor operatively connected to the first diameter cutting reels and a second model of electric motor operatively connected to the second diameter cutting reels, wherein the first and second models of electric motors have separate and distinct couplings for coupling the models to the first and second diameter cutting reels such that the first model of electric motor is not capable of being coupled to the second diameter cutting reel and the second model of electric motor is not capable of being coupled to the first diameter cutting reel.

10. The reel mower of claim 9, wherein the mower controller automatically acquires the reel size information by acquiring information indicating for each reel cutting unit which model of electric motor is coupled to the cutting reel.

11. The reel mower of claim 1, wherein the motor controller of each electric motor has a memory that stores the reel size information for the cutting reel being driven, and wherein the reel size information stored in the motor controllers of all the currently carried reel cutting units is passed to the mower controller through a two-way communication channel between the motor controllers and the mower controller.

* * * * *